(12) United States Patent
Kecalevic et al.

(10) Patent No.: US 12,157,518 B2
(45) Date of Patent: Dec. 3, 2024

(54) ENERGY STORAGE UNDERBODY FOR A MOTOR CAR BODY-IN-WHITE

(71) Applicant: Bayerische Motoren Werke Aktiengesellschaft, Munich (DE)

(72) Inventors: Nermin Kecalevic, Markt Schwaben (DE); Juergen Leschhorn, Geltendorf (DE); Roland Wanka, Buch am Erlbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 513 days.

(21) Appl. No.: 17/311,841

(22) PCT Filed: Nov. 19, 2019

(86) PCT No.: PCT/EP2019/081725
§ 371 (c)(1),
(2) Date: Jun. 8, 2021

(87) PCT Pub. No.: WO2020/120076
PCT Pub. Date: Jun. 18, 2020

(65) Prior Publication Data
US 2022/0017152 A1    Jan. 20, 2022

(30) Foreign Application Priority Data
Dec. 14, 2018 (DE) ............. 10 2018 132 255.0

(51) Int. Cl.
*B62D 25/20* (2006.01)
*B60K 1/04* (2019.01)
(Continued)

(52) U.S. Cl.
CPC ............ *B62D 25/2036* (2013.01); *B60K 1/04* (2013.01); *B62D 25/20* (2013.01); *H01M 50/249* (2021.01);
(Continued)

(58) Field of Classification Search
CPC .... B60K 2001/0438; B60K 2001/0472; B62D 25/2036; B62D 25/20; H01M 50/249
See application file for complete search history.

(56) References Cited

U.S. PATENT DOCUMENTS 6,188,574 B1 * 2/2001 Anazawa ............... B60L 1/003
180/68.5
8,939,246 B2 * 1/2015 Yamaguchi ............ B60L 50/66
180/311
(Continued)

FOREIGN PATENT DOCUMENTS

CN    103303374 A  *  9/2013  ............... B60K 1/04
CN    210734286 U  *  6/2020  ............... B60K 1/04
(Continued)

OTHER PUBLICATIONS

International Search Report (PCT/ISA/210) issued in PCT Application No. PCT/EP2019/081725 dated Mar. 5, 2020 with English translation (seven (7) pages).
(Continued)

*Primary Examiner* — Jason S Morrow
(74) *Attorney, Agent, or Firm* — Crowell & Moring LLP

(57) ABSTRACT

An energy storage underbody is provided for a motor car body-in-white in which a vehicle floor is laterally delimited by side sills and is reinforced by side members and/or cross members, and in which an energy storage device is disposed on the underside of the vehicle floor. In order to obtain an energy storage device of particularly simple construction and a particularly economical, stiffened underbody, the energy storage underbody has at least one housing of the energy storage device, the housing being non-loadbearing in terms of the body-in-white, and has at least one additional side member or cross member disposed on the topside of the vehicle floor to reinforce the underbody.

8 Claims, 3 Drawing Sheets

(51) Int. Cl.
*H01M 50/249* (2021.01)
*B62D 25/02* (2006.01)

(52) U.S. Cl.
CPC ............... *B60K 2001/0438* (2013.01); *B60K 2001/0472* (2013.01); *B62D 25/025* (2013.01)

(56) References Cited

U.S. PATENT DOCUMENTS

| | | | |
|---|---|---|---|
| 9,227,582 B2* | 1/2016 | Katayama | H01M 50/24 |
| 9,281,505 B2* | 3/2016 | Hihara | B62D 25/20 |
| 11,186,158 B2* | 11/2021 | Yamada | B60L 50/66 |
| 11,691,494 B2* | 7/2023 | Yamada | H01M 50/244 180/68.5 |
| 2013/0229030 A1 | 9/2013 | Yamaguchi et al. | |
| 2013/0270864 A1 | 10/2013 | Young et al. | |
| 2014/0284125 A1 | 9/2014 | Katayama et al. | |
| 2017/0225558 A1 | 8/2017 | Newman et al. | |
| 2018/0126857 A1 | 5/2018 | Kelly-Morgan | |
| 2018/0229772 A1 | 8/2018 | Erlacher et al. | |
| 2018/0312199 A1* | 11/2018 | Kawase | B60K 1/04 |
| 2020/0189378 A1 | 6/2020 | Hirsch et al. | |
| 2022/0016966 A1* | 1/2022 | Kecalevic | B62D 21/157 |
| 2022/0176791 A1* | 6/2022 | Danneberg | B60K 1/04 |
| 2022/0297523 A1* | 9/2022 | Danneberg | H01M 50/258 |
| 2022/0306207 A1* | 9/2022 | Katayama | B62D 25/20 |
| 2023/0202580 A1* | 6/2023 | Jeong | B62D 27/023 180/65.1 |
| 2023/0253660 A1* | 8/2023 | Jeong | H01M 50/262 429/122 |
| 2023/0264758 A1* | 8/2023 | Carl | B62D 25/20 296/187.12 |

FOREIGN PATENT DOCUMENTS

| | | | | |
|---|---|---|---|---|
| DE | 10 2012 203 882 A1 | | 9/2013 | |
| EP | 2 468 609 A2 | | 6/2012 | |
| JP | 2000108948 A | * | 4/2000 | |
| JP | 6555550 B2 | * | 8/2019 | |
| WO | WO-2013038255 A2 | * | 3/2013 | ............... B60K 1/04 |
| WO | WO-2013042628 A1 | * | 3/2013 | ............... B60K 1/04 |

OTHER PUBLICATIONS

German-language Written Opinion (PCT/ISA/237) issued in PCT Application No. PCT/EP2019/081725 dated Mar. 5, 2020 (five (5) pages).

German-language Office Action issued in German Application No. 10 2018 132 255.0 dated Nov. 29, 2019 (four (4) pages).

English translation of Chinese-language Office Action issued in Chinese Application No. 201980076093.7 dated Dec. 13, 2023 (7 pages).

* cited by examiner

ENERGY STORAGE UNDERBODY FOR A MOTOR CAR BODY-IN-WHITE

BACKGROUND AND SUMMARY OF THE INVENTION

The invention relates to an energy storage underbody for a motor car body-in-white.

Such an energy storage underbody is already known from EP 2 468 609 A2, in which a vehicle floor of the underbody is delimited laterally by respective side rocker panels and stiffened by longitudinal members and/or crossmembers. The energy storage device is formed in this case by a housing which accommodates the respective battery cells or battery modules. This housing is stiffened by a frame-like construction of outer circumferentially encircling profile elements and a plurality of crossmembers such that the energy storage device can be fastened to the underside of the vehicle floor, in particular in the region of the side rocker panels, via respective bolted connections. In order to obtain here a force transmission between the energy storage device and the underbody that is as favorable as possible, the energy storage device is tailored in terms of its size and shape to the opening which is formed on the underside of the vehicle floor by the side rocker panels and the respective crossmembers. Accordingly, the housing of the energy storage device can be positioned and fastened, at least substantially in a form-fitting manner, between the respective side rocker panels. As a result, the energy storage device functions as an element of the underbody that is concomitantly load-bearing with respect to the body-in-white.

Although the load-bearing function of the housing of the energy storage device allows a relatively stiff connection between the energy storage device and underbody, the concomitantly load-bearing function of the housing of the energy storage device makes the latter extremely complicated to manufacture and, moreover, heavy. It is thus necessary, for example in the event of a side impact, for introduced forces to be taken up by the housing of the energy storage device as well, thereby requiring the latter to be designed in a correspondingly stiff and stable manner. There moreover result double process chains between the energy storage device and the remaining components of the underbody, since they act jointly as a unit. A further problem is that of the load transfer points in the region of the bolts via which the energy storage device is fastened to the respective side rocker panel. Particularly under the action of accident-induced force, these load transfer points are at extreme risk of failure, requiring considerable measures to be taken to avoid this. Moreover, the transition between the energy storage device and the underbody causes the respective load paths to be interrupted, which can also prove disadvantageous in terms of force transmission, in particular in the event of an accident.

The object of the present invention is therefore to provide an energy storage underbody in which the energy storage device can be produced particularly simply and the underbody is stiffened in a particularly favorable manner.

This object is achieved according to the invention by an energy storage underbody having the features of the independent claim. Advantageous developments form the subject matter of the dependent claims.

The energy storage underbody according to the invention comprises a vehicle floor which is delimited laterally by respective side rocker panels and stiffened by longitudinal members and/or crossmembers, and also an energy storage device which is arranged on the underside of the vehicle floor. In order then to obtain an energy storage device of particularly simple construction or to obtain a particularly favorable stiffened underbody, there is provision according to the invention that the energy storage underbody comprises at least one housing of the energy storage device that is non-load-bearing with respect to the body-in-white, and at least one additional longitudinal member or crossmember arranged on the upper side of the vehicle floor for stiffening the underbody. Accordingly, there is provision according to the invention to implement a separation between the receiving and sealing function of the energy storage device on the one hand and the stiffening function which, in the prior art to date, has also been performed by the housing of the energy storage device, by virtue of now providing, on the upper side of the vehicle floor, at least one further longitudinal member or crossmembers for stiffening the underbody. Accordingly, there is provision according to the invention that at least one housing of the energy storage device be configured without frame elements, profiles or the like that contribute to the stiffening of the underbody or of the motor car body-in-white and to taking up accident energy under the action of a corresponding accident-induced force. Rather, the function performed by the housing of the energy storage device is in particular that of tightly receiving the respective battery cells or battery modules.

Since the housing of the energy storage device is thus formed without concomitantly load-bearing elements of the underbody, said housing can be configured in a considerably more cost-effective manner. Moreover, the respective longitudinal members or crossmembers which, as a result of the omission of respective members in the region of the energy storage device, are additionally arranged to the side of the vehicle floor make it possible for optimized load paths to be formed in the underbody or in the motor car body-in-white without the need here for corresponding load transfer points such as bolts or the like. There is thus not only provided a simpler solution which is more favorable in production terms, but moreover improves stiffness and stability of the underbody can also be achieved.

In a further embodiment of the invention, the at least one housing of the energy storage device is arranged at a distance from the side rocker panels or from a front or rear crossmember of the underbody. Since, according to the invention, the housing of the energy storage device no longer contributes to stiffening the underbody, said housing can accordingly be arranged so as to be set back in relation to the side rocker panels or in relation to a front or rear crossmember, this in turn having the advantage that, under the action of an accident-induced force, for example in the event of a side impact, the housing of the energy storage device can be protected from damage in an improved manner.

Furthermore, it has been shown to be advantageous if the underside of the at least one housing has arranged thereon a carrier element via which the at least one housing is held on the underside of the vehicle floor. The carrier element here can be in particular a carrier plate on which there is supported the at least one housing of the energy storage device that for its part receives a plurality of battery cells or battery modules. Such a carrier element makes it possible to achieve particularly simple mounting of the at least one housing of the energy storage device on the vehicle floor. Moreover, the carrier element is designed in a particularly advantageous manner in order to protect the at least one housing of the energy storage device from damage, for example upon collision with a bollard or the like.

A further advantageous embodiment of the invention provides for the carrier element to be arranged at a distance from the side rocker panels or from a front or rear crossmember of the underbody. This measure also allows damage to the energy storage device to be reduced in an improved manner, namely in particular in the event of a side impact.

A further advantageous embodiment of the invention provides for a clearance to be provided between the energy storage device and the respective side rocker panel. This makes it possible for the side rocker panel, under the action of an accident-induced force, to be deformed to a certain extent before damage can occur to the energy storage device.

In a further embodiment of the invention, a plurality of housings of the energy storage device that extend parallel to one another are provided. They can advantageously extend parallel to one another in the vehicle transverse direction. It is particularly advantageous, however, if the plurality of housings extend parallel to one another in the vehicle longitudinal direction, since it has been shown from experience that they can then be designed to be longer and larger, with resulting overall cost advantages being able to be achieved. Moreover, a plurality of housings also has the advantage that the attachment thereof to the vehicle floor is far simpler than when there is one large housing in which a central attachment has to be provided, with this customarily being able to be realized only with considerable technical effect and complexity.

In a further advantageous embodiment of the invention, to the side of the respective housing there is arranged a respective holding profile on the underside of the vehicle floor via which the respective housing is connected to the vehicle floor. Such an arrangement of housings and intermediately or laterally arranged holding profiles allows particularly favorable and simple fixing of the respective housings to the underside of the vehicle floor.

Furthermore, it has been shown to be advantageous if the respective housing is clamped between the respective holding profile and the carrier element, in particular via a clamping rail. The result of this is large-size fixing of the respective housing to the underside of the vehicle floor in a manner that is particularly favorable in terms of tolerance compensation.

Finally, it has been shown to be advantageous if, to stiffen the underbody, the at least one crossmember arranged on the upper side of the vehicle floor is provided in addition to in any case present seat crossmembers and extends continuously between the side rocker panels or is attached thereto. This optimally results in a corresponding rectilinearly extending load path between the respective side rocker panels that is able to be highly loaded precisely in the event of a side impact or the like.

Further features of the invention will emerge from the claims, the figures and the description of the figures. The features and combinations of features stated above in the description, and also the features and combinations of features which are stated below in the description of the figures and/or are shown in the figures alone, may be used not only in the respectively specified combination, but also in other combinations or in isolation.

The invention will now be explained in more detail on the basis of a preferred exemplary embodiment and with reference to the drawings.

DETAILED DESCRIPTION OF THE DRAWINGS

Figure 1:
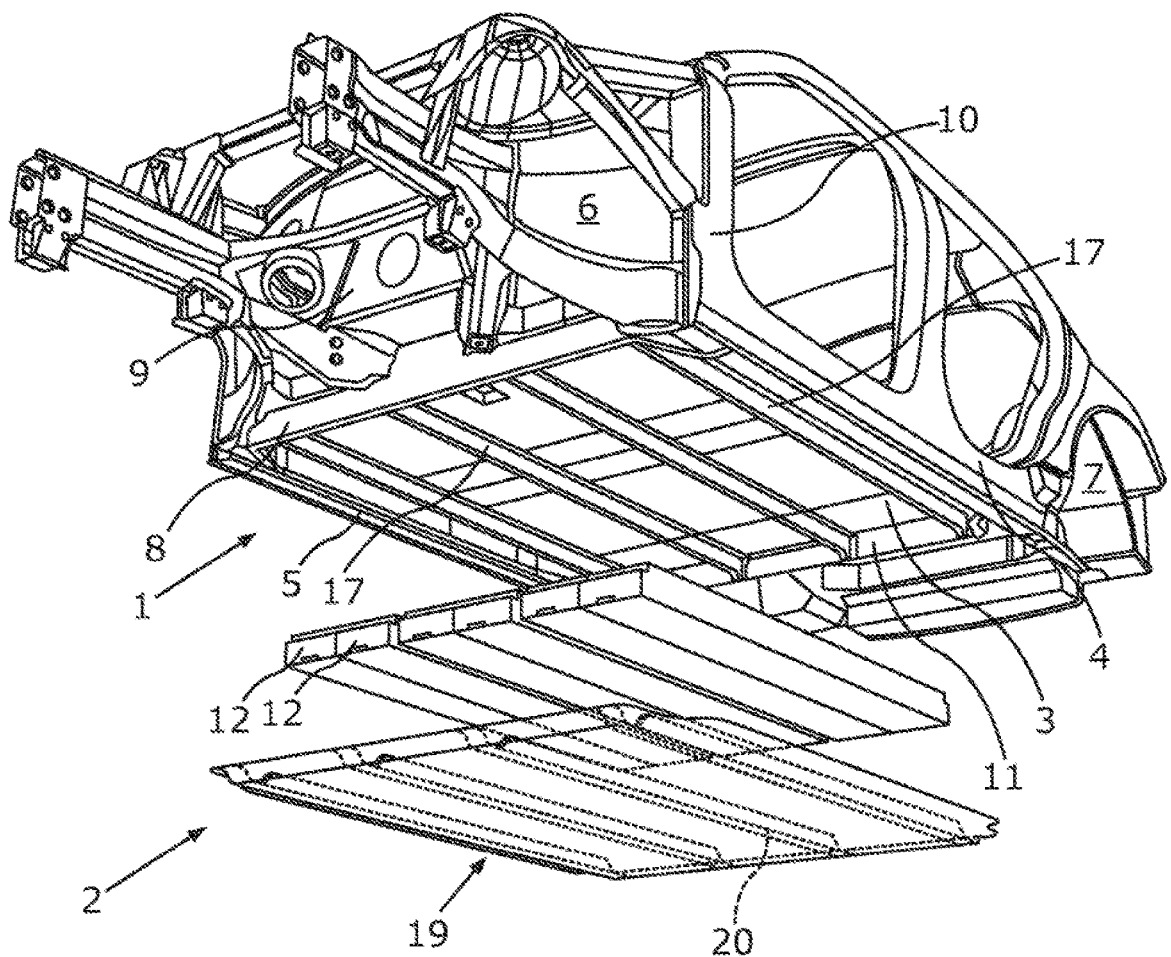
FIG. 1 is a schematic bottom view of a motor car body having an energy storage underbody in which a vehicle floor is delimited laterally by respective side rocker panels and stiffened by longitudinal members and/or crossmembers, and in which an energy storage device is arranged on the underside of the vehicle floor that comprises a plurality of housings which extend in the vehicle longitudinal direction and are designed to be non-load-bearing with respect to the body-in-white.

FIG. 1 is a perspective bottom view showing a motor car body-in-white of a passenger motor car. Here, an energy storage underbody is formed by a body-in-white underbody 1, which will be explained in more detail below, and an energy storage device 2, which is illustrated here in exploded view beneath the underbody 1. The energy storage device 2 allows electrical energy to be able to supplied to a drive of the motor car, which is, for example, driven with a fully electrical drive or by means of a hybrid drive.

The underbody 1 is substantially formed by a, here mostly planar, vehicle floor 3, which is formed in particular from one or more shaped sheet-metal components. This vehicle floor 3 is delimited laterally by respective side rocker panels 4, 5 which extend substantially horizontally in the vehicle longitudinal direction between respective front and rear wheelhouses 6, 7 of each vehicle side. In the front region, the underbody 1 is delimited toward the front by a front crossmember 8 which—with respect to the vehicle longitudinal direction—extends at the level of a firewall 9 which partitions the vehicle cell off from the front-end structure of the motor car. Here, the crossmember 8 extends horizontally and in the vehicle transverse direction between respective front ends of the side rocker panels 4, 5 or lower ends of corresponding front door pillars 10. In a rear region, the underbody has a rear crossmember 11 which extends horizontally and in the vehicle transverse direction approximately—with respect to the vehicle longitudinal direction—at the level of the respective rear ends of the side rocker panels 4, 5.

The vehicle floor 3, together with the side rocker panels 4, 5 and the crossmembers 8, 11, forms a downwardly open trough in which the energy storage device 2 is arranged below the vehicle floor 3 in a manner which will be described in more detail below.

Here, the arrangement of the energy storage device 2 below the vehicle floor 3 will be explained below on the basis of FIGS. 2 and 3, which show the energy storage underbody in a perspective view or a sectional view from the front in each case along a section plane running in the vehicle transverse direction or in the vehicle vertical direction. It can be seen here that the energy storage device 2 comprises a plurality of, in the present case six, individual housings 12 which, in each case consisting of a cross-sectionally substantially U-shaped upper part 13 and a likewise substantially cross-sectionally U-shaped lower part 14, are connected to one another along a respective flanged connection 15. Here, the flanged connection 15 is formed by respective flanges of the upper part 13 and of the lower part 14 and extends in circumferentially enclosing closed fashion around the respective overall housing 12. As a result, battery cells or battery module 16 that are arranged within the respective housing 12 are received tightly within the respectively assigned housing 12.

Here, the plurality of housings 12 extend parallel to one another approximately horizontally and in the vehicle longitudinal direction. To the side of each of the housings 12, or between the individual housings 12, a respective holding profile 17 extends horizontally and in the vehicle longitudinal direction and has here, as viewed substantially in cross section, a hat-shaped profile and is fixed by means of respective flanges 18 to the underside of the vehicle floor 3, for example by way of a welded connection or some other kind of joining connection. The holding profiles 17 are here particularly also visible in FIG. 1 on the underside of the vehicle floor 3. They serve primarily to hold the energy storage device 2, which is formed by the plurality of housings 12. Accordingly, the holding profiles 17 are also arranged outside of the energy storage device 2.

Particularly in FIG. 1 there can be seen a carrier element 19 in the form of a carrier plate which, for example, can take the form of a shaped sheet-metal part, a plastics component or a cast metal component. In the present case, the carrier plate 19 is designed to be substantially planar and has on its upper side respective clamping rails 20 which, in the respective central region between the individual housings 12, are configured to be double-T-shaped and, to the outside of the outermost housing 12, are configured in the manner of a box profile as viewed in cross section. These clamping rails 20 are, for example, fastened to the upper side or inner side of the carrier element 19 by way of a welded connection, some other joining connection or the like, and are aligned with the respectively corresponding holding profile 17, which for its part is fastened to the underside of the vehicle floor 3. Accordingly, the respective clamping rails 20 also extend at least substantially horizontally and in the vehicle longitudinal direction when the carrier element 19 is mounted on the underbody 1.

During the mounting operation, the carrier element 19 with the clamping rails 20 is equipped with the individual housings 12 and then fastened to the underside of the vehicle floor 3. Here, the housings 12 have their respective flanged connections 15 clamped between respective holding profile 17 and the respective clamping rail 20 by virtue of the carrier plane 19 being fastened to the underside of the vehicle floor 3. This is primarily effected by corresponding bolted connections or other mechanical connection means being set between the carrier element 19 or the respective clamping rail 20 and the associated holding profile 17, with the result that the respective flanged connection 15 of the corresponding housing 12 is clamped between the respective holding profile 17 and the associated clamping rail 20.

The carrier plate 19 here serves not only for mounting and holding the respective housings 12, but also for protecting them. Particularly in the case of traveling over a bollard, the respective housings 12 are thus optimally protected from damage.

Figure 2:
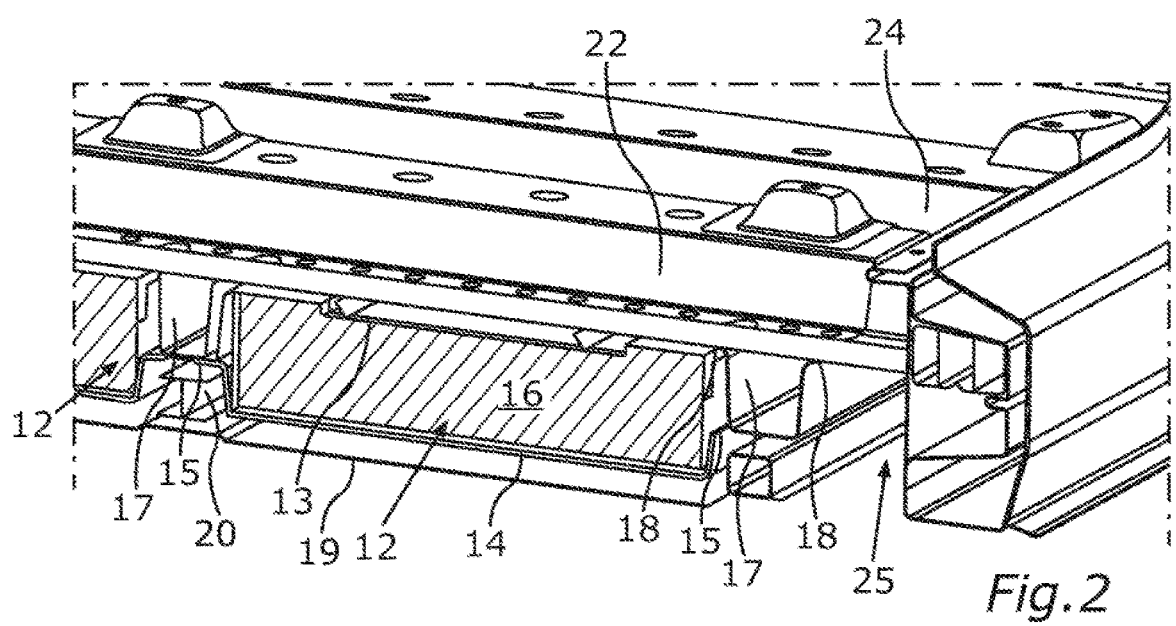
FIG. 2 is a perspective sectional view through the energy storage underbody according to FIG. 1 along a section plane which extends in the vehicle vertical direction or in the vehicle transverse direction.
Figure 3:
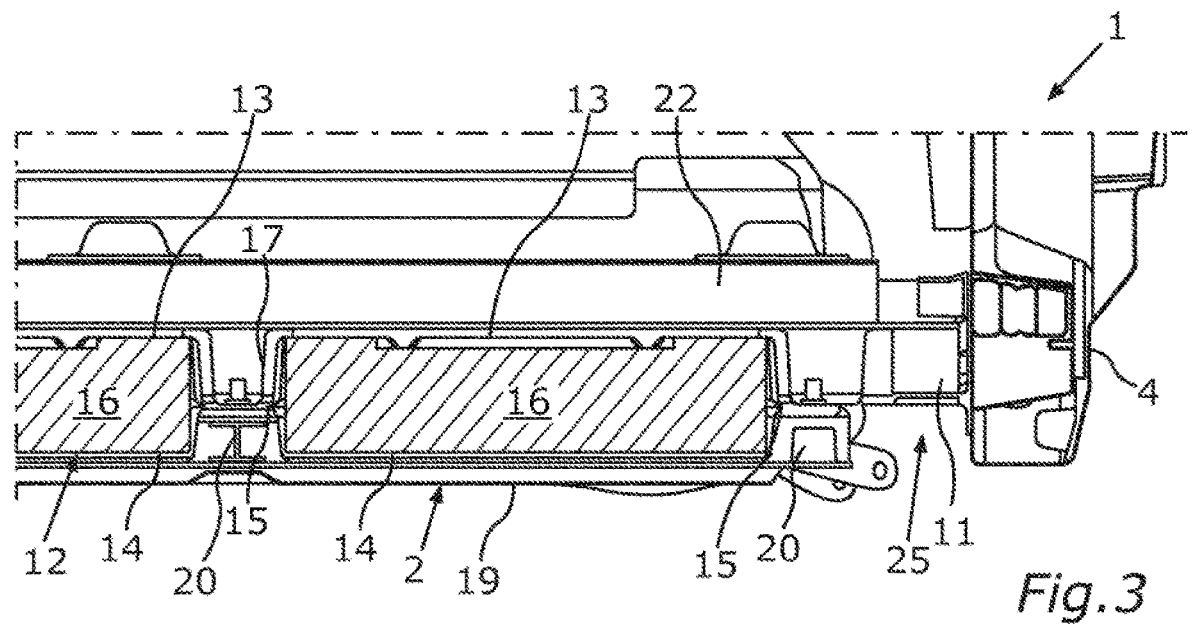
FIG. 3 is a sectional view, in the form of a detail, of the energy storage underbody according to FIGS. 1 and 2 along a section plane extending in the vehicle transverse direction or vehicle vertical direction.

It can particularly also be seen from FIGS. 2 and 3 that both the respective housings 12 and the carrier plate 19 terminate at a lateral distance from the respectively corresponding side rocker panel 4, 5. In other words, a clearance 25, which extends upwardly toward the underside of the vehicle floor 3, is provided between the energy storage device 2 and the respective side rocker panel 4, 5. There is therefore substantially no connection between the energy storage device 2 and the respective side rocker panel 4, 5 below the vehicle floor 3.

Moreover, it can be seen in particular from FIGS. 2 and 3 that the respective housing 12 with the respective upper parts 13 and lower parts 14 is designed to be substantially without a load-bearing structure. This means in particular that no bearers or bearer-like depressions are provided that would contribute in particular to stiffening the body in the vehicle transverse direction. It is also the case that, by contrast with the prior art to date, there is no frame provided which runs in an encircling manner around the energy storage device and via which the latter could be attached, for example, to the side rocker panels 4, 5. Toward the front or toward the rear in the vehicle longitudinal direction there can also be provided respective distances between the respective housings 12 and the corresponding crossmembers 8 and 11. This also applies to the carrier plate 19, which may, where appropriate, likewise terminate at a distance from said crossmembers 8, 11.

Figure 4:
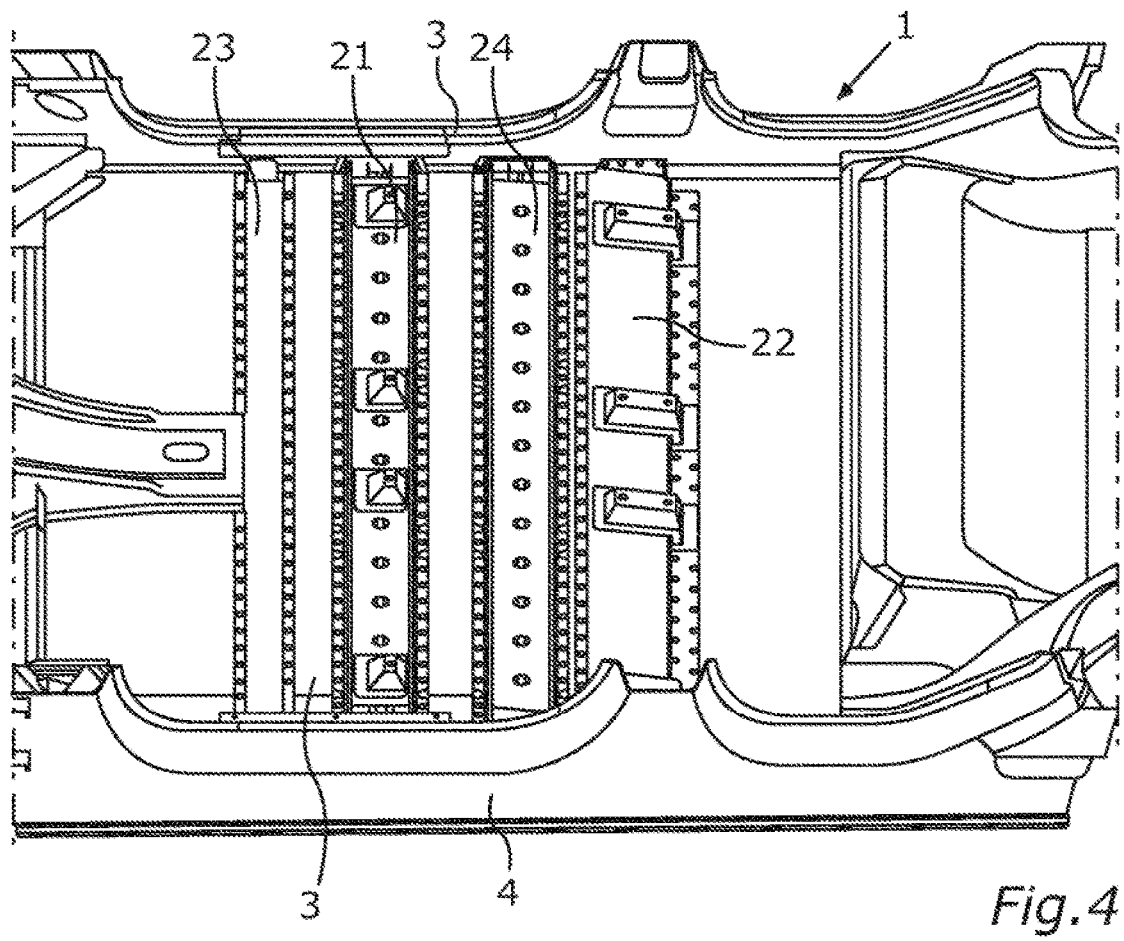
FIG. 4 is a perspective view, in the form of a detail, of the vehicle floor of the underbody of the motor car body-in-white, with there being able to be seen, apart from the seat crossmembers, additional crossmembers for stiffening the underbody.

Since the energy storage device 2, and in particular its housing 12, does indeed have a sealing function for the battery module 16 arranged within it, but in particular no stiffening and load-bearing properties for the motor car body-in-white, there occurs additional stiffening of the underbody, as can be seen from FIG. 4 in a perspective and detail plan view. It can be seen in particular here that, in addition to respective seat crossmembers 21, 22, there are provided in the present case two further crossmembers 23, 24 which have up until now not been required on energy storage underbodies created in the conventional way according to the above-described prior art. Since namely, according to the invention, the respective housings 12 do not have a load-bearing and stiffening function for the motor car body-in-white or the underbody 1, this is accomplished by the crossmembers 23, 24 which extend on the upper side of the vehicle floor 3 or are fixed to the upper side thereof. The crossmembers 23, 24 extend here over the full width of the underbody between the two side rocker panels 4, 5, on which they are supported and also fastened. This results in two optimal load paths between the respective side rocker panels 4, 5 without—as in the prior art to date—a diversionary path having to be chosen by way of corresponding load transfer points in the form of bolts or the like at which the load was transferred from the underbody or the motor car body-in-white, in particular from the side rocker panels 4, 5, to the energy storage device 2 and its housing 12.

It is evident here that load paths are thus created which have been created in a simple manner by means of the respective crossmembers 23, 24 and can be welded in a simple manner and accordingly are attached not only in pointwise fashion. Moreover, a further main advantage of this design is that the described functional separation between the tightness of the respective housings 12 and the mechanical stiffening of the underbody 1 or of the motor car body-in-white is achieved. This makes it possible in particular for the respective housing 12 and the energy storage device 2 overall to be produced considerably more cost-effectively and, moreover, for an improved gripping function of the motor car body-in-white and of its underbody 1 to be achieved.

A further advantage is afforded by the fact that, between the side rocker panels 4, 5 and the energy storage device 2, in particular its housing 12, there is provided a gap or clearance 25 which is possible only by virtue of the fact that the respective housing 12 or the energy storage device 2 overall does not have to contribute to the stiffening of the underbody 1 and accordingly does not have to be necessarily fastened to the respective side rocker panel 4, 5. This particularly has the advantage that, in the event of a side impact of one of the side rocker panels 4, 5, there is a considerable distance to the energy storage device 2 or the respective housing 12, with the result that damage to the energy storage device 2 arises far later in the course of the accident scenario in the event of a side impact.

Since the energy storage device is formed from a plurality of individual housings 12 which, on account of their non-load-bearing function, do not have to be connected to one another, it is possible to dispense with an extremely complicated central attachment of the energy storage device 2 that has been required up until now. Rather, the individual housings 12 are optimally held in the underfloor region in particular by the combination of the carrier plate 19 with the holding profiles 17 and the clamping rails 20.

Figure 5:
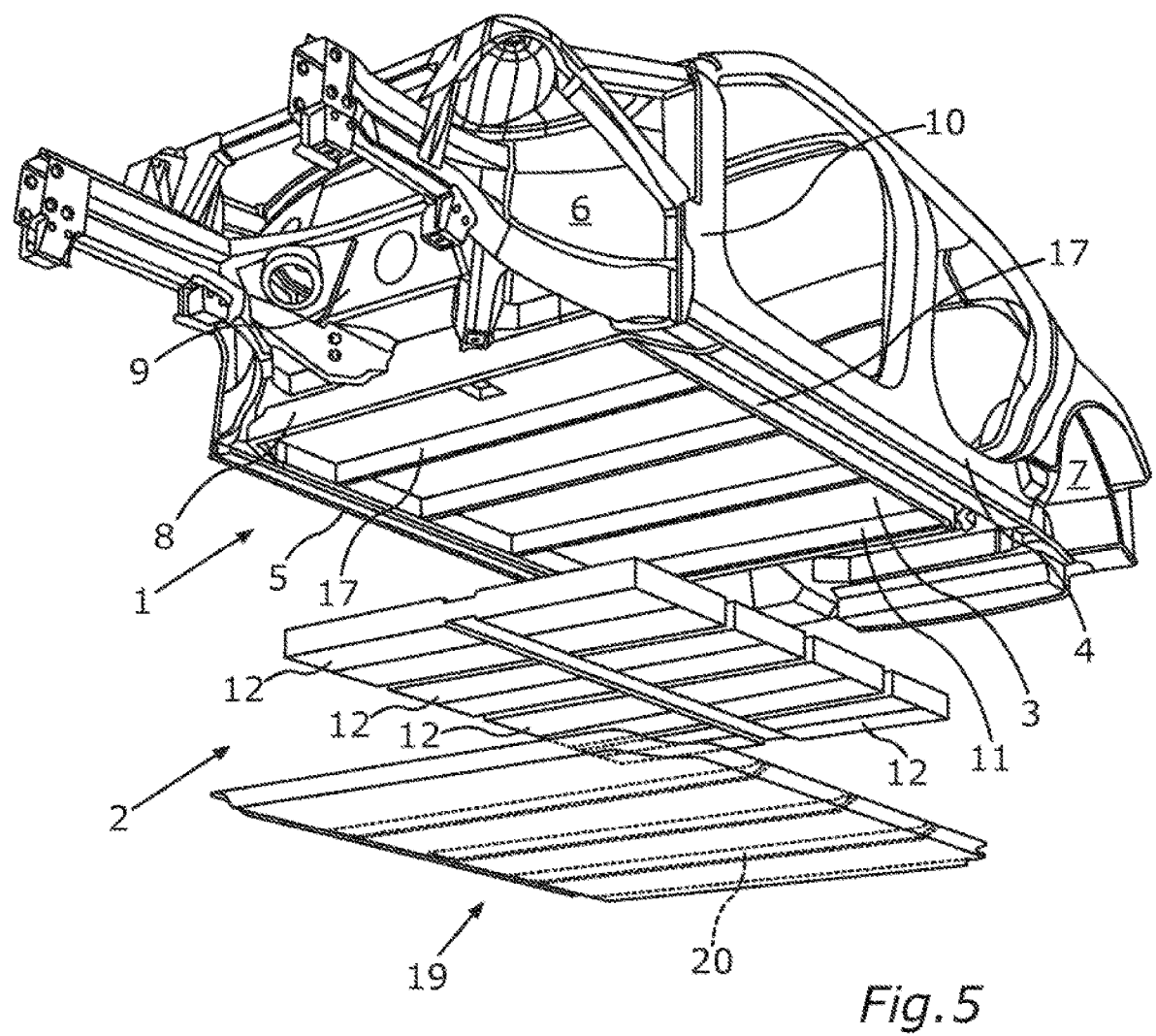
FIG. 5 is a perspective bottom view of a motor car body-in-white having an energy storage underbody.

Finally, FIG. 5 shows an alternative embodiment of the energy storage underbody in which, unlike in the embodiment according to FIGS. 1 to 4, the respective housings 12 extend in the vehicle transverse direction. This configuration can offer itself in particular if housings 12 can thereby be created that are longer than if they extend in the vehicle longitudinal direction. In this configuration, too, the housings 12 or the carrier plate 19 can have a respective distance from the side rocker panels 4, 5 or from the crossmembers 8, 11.

The scope of the invention is also considered to cover the situation in which, particularly with the arrangement of the housings 12 according to FIGS. 1 to 4, the latter can also extend toward the front or rear directly up to the crossmember 8 or 11. Conversely, in the embodiment according to FIG. 5, the housings 12 can also extend up to the respective side rocker panels 4, 5. The carrier plate 19 can also, where appropriate, extend up to the side rocker panels 4, 5 or the crossmembers 8, 11. There remains unaffected as a result of this the functional separation of the sealing function by the housings 12 and of the stiffening and stabilizing function by the crossmembers 23, 24.

LIST OF REFERENCE SIGNS

1 Underbody
2 Energy storage device
3 Vehicle floor
4 Side rocker panel
5 Side rocker panel
6 Wheelhouse
7 Wheelhouse
8 Crossmember
9 Firewall
10 Door pillar
11 Crossmember
12 Housing
13 Upper part
14 Lower part
15 Flanged connection
16 Battery module
17 Holding profile
18 Flange
19 Carrier element
20 Clamping rail
21 Seat crossmember
22 Seat crossmember
23 Crossmember
24 Crossmember
25 Clearance

What is claimed is:

1. An energy storage underbody for a motor car body-in-white, in which a vehicle floor is delimited laterally by respective side rocker panels and stiffened by longitudinal members and/or crossmembers, and in which an energy storage device is arranged on an underside of the vehicle floor, comprising:
   at least one housing of the energy storage device that is non-load-bearing with respect to the body-in-white and is without load transfer points that transfer loads from the body-in-white to the housing, the housing being configured without frame elements, and sealing a battery module arranged within the housing; and
   at least one additional crossmember arranged on an upper side of the vehicle floor to stiffen the underbody due to the non-load bearing housing, the at least one additional crossmember extending continuously between the side rocker panels, the additional crossmember not being a seat crossmember.

2. The energy storage underbody according to claim 1, wherein
   the at least one housing of the energy storage device is arranged at a distance from the side rocker panels or from a front or rear crossmember of the underbody.

3. The energy storage underbody according to claim 1, wherein
   the at least one housing has arranged on an underside thereof a carrier plate via which the at least one housing is held on the underside of the vehicle floor.

4. The energy storage underbody according to claim 3, wherein
   the carrier plate is arranged at a distance from the side rocker panels or from a front or rear crossmember of the underbody.

5. The energy storage underbody according to claim 1, wherein
   a clearance is provided between the energy storage device and a respective side rocker panel.

6. The energy storage underbody according to claim 1, wherein
   a plurality of housings extending parallel to one another are provided.

7. The energy storage underbody according to claim 1, wherein
   to a side of the respective housing, there is arranged a respective holding profile on the underside of the vehicle floor, via which the respective housing is connected to the vehicle floor.

8. An energy storage underbody for a motor car body-in-white, in which a vehicle floor is delimited laterally by respective side rocker panels and stiffened by longitudinal members and/or crossmembers, and in which an energy storage device is arranged on an underside of the vehicle floor, comprising:
   at least one housing of the energy storage device that is non-load-bearing with respect to the body-in-white; and
   at least one additional longitudinal member or crossmember arranged on an upper side of the vehicle floor for stiffening the underbody, wherein
   to a side of a respective housing, there is arranged a respective holding profile on the underside of the vehicle floor, a carrier element is arranged on an underside of the respective housing, and the respective housing is clamped between the respective holding profile and the carrier element via a clamping rail, whereby the housing is held on the underside of the vehicle floor.

\* \* \* \* \*